US006662011B1

(12) United States Patent
Sale et al.

(10) Patent No.: US 6,662,011 B1
(45) Date of Patent: Dec. 9, 2003

(54) METHOD FOR PERFORMING RAPID HANDOFFS IN A WIRELESS COMMUNICATION SYSTEM USING VIRTUAL CONNECTIONS

(75) Inventors: Darryl Sale, Chandler, AZ (US); Thomas S. Chu, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/398,308

(22) Filed: Sep. 20, 1999

(51) Int. Cl.$^7$ ................................................. H04Q 7/20
(52) U.S. Cl. ...................... 455/428; 455/427; 455/12.1; 455/436
(58) Field of Search ................................ 455/427, 428, 455/429, 430, 12.1, 13.1, 552, 557, 436, 442, 445, 13.2

(56) References Cited

U.S. PATENT DOCUMENTS

| 5,483,664 A | * | 1/1996 | Moritz et al. ............... 455/428 |
| 5,537,679 A | * | 7/1996 | Crosbie et al. ............. 455/13.2 |
| 5,561,838 A | * | 10/1996 | Chandos et al. ........... 455/13.1 |
| 5,574,968 A | * | 11/1996 | Olds et al. .................. 455/428 |
| 5,644,318 A | * | 7/1997 | Janky .................... 342/357.08 |
| 5,678,174 A | * | 10/1997 | Tayloe ....................... 455/13.1 |
| 5,999,797 A | * | 12/1999 | Zancho et al. ............. 455/12.1 |
| 6,070,073 A | * | 5/2000 | Maveddat et al. .......... 455/428 |
| 6,138,012 A | * | 10/2000 | Krutz et al. ................ 455/427 |
| 6,272,314 B1 | * | 8/2001 | Emmons, Jr. et al. ..... 455/12.1 |
| 6,278,861 B1 | * | 8/2001 | Ward ......................... 455/13.1 |
| 6,314,269 B1 | * | 11/2001 | Hart .......................... 455/12.1 |

* cited by examiner

*Primary Examiner*—Nay Maung
*Assistant Examiner*—John J Lee
(74) *Attorney, Agent, or Firm*—Frank J. Bogacz

(57) ABSTRACT

A method for efficiently and rapidly handing off a subscriber link from a first satellite (14) to a second satellite (12) in a satellite communications system (10) uses a virtual connection (44) between the first satellite (14) and a subscriber (18) through the second satellite (12). The virtual connection (44) is established soon after a handoff decision has been made. All signals subsequently received by the first satellite (14) for direct transmission to the subscriber (18) are then automatically transferred to the subscriber (18) through the virtual connection (44). The virtual connection (44) is terminated after a "call rerouted" signal has been received from a remote gateway (20).

21 Claims, 2 Drawing Sheets

METHOD FOR PERFORMING RAPID HANDOFFS IN A WIRELESS COMMUNICATION SYSTEM USING VIRTUAL CONNECTIONS

FIELD OF THE INVENTION

The invention relates generally to wireless communication systems and, more particularly, to methods for performing handoffs in wireless communication systems.

BACKGROUND OF THE INVENTION

A satellite communication system is a system that provides communication services to subscribers using communication satellites orbiting about the earth. The satellites act as nodes in a large scale communication network, each node being able to direct communication traffic flow through the network in accordance with a predetermined routing plan. In a typical communication connection in a satellite communication system, a first user communicates with a remote user via a series of satellite up-links, cross-links, and down-links. That is, a first two-way wireless link is established between the first user and a first satellite in the constellation, one or more satellite cross-links are used to provide communication between the first satellite and a remote satellite, and a second two-way wireless link is established between the remote satellite and the remote user. The communication signals (e.g., data packets) flowing between the first user and the second user will generally include routing information that specifies the particular route though the system that the signal is to take to arrive at its intended destination. The particular route used for a given connection is normally assigned during an initial call set up operation. Once a communication connection has been established, the route that the communication signals take through the system for the connection is generally fixed until an event occurs that requires a route change.

As the satellites in the satellite communication system rotate within their orbits, it often becomes necessary to change the particular satellite that is providing the link to a given subscriber. This will become necessary, for example, when the quality of the link between a current satellite and the subscriber has degraded below a threshold level. When this occurs, a satellite "handoff" operation will generally be performed to change the satellite providing the subscriber link from the current satellite (i.e., the first satellite) to a new satellite (i.e., the second satellite). As can be appreciated, a satellite handoff will change the route that communication packets will take through the system for the given connection.

In the past, a satellite handoff was performed by first requesting a communication channel within the second satellite to support the subscriber link. If a channel was available, the channel was reserved for the subscriber link and a handoff request signal was delivered to a remote entity at the other end of the communication connection (e.g., a gateway) requesting a handoff. Upon receiving the handoff request signal, the remote entity would determine a new route between the remote entity and the subscriber that included a direct link between the second satellite and the subscriber. All future packets delivered from the remote entity to the subscriber would indicate the new route in the associated routing information. The first satellite would then be notified of the route change and the direct link between the first satellite and the subscriber would be terminated.

While effective, the above-described handoff technique can take a relatively long time to accomplish. That is, the need to route a message back to the gateway before a handoff can be effected can create delays that can degrade call quality. In addition, situations might arise where the first satellite loses contact with the subscriber before the handoff to the second satellite is complete. This could result in, for example, a loss of data. Similar problems exist in other types of wireless communication systems such as, for example, terrestrial-based wireless networks.

Therefore, there is a need for a handoff technique for use in a wireless communication network that is capable of efficiently and rapidly handing off a communication link from a first node in the network to a second node in the network. The technique should be capable of use in a satellite communication system to handoff a subscriber link from a first satellite to a second satellite.

DETAILED DESCRIPTION OF A PREFERRED EMBODIMENT

The present invention relates to a method for efficiently and rapidly handing off a communication link in a wireless communication network from a first node to a second node. In a preferred embodiment, the method is used to handoff a subscriber link from a first satellite to a second satellite in a satellite communications system. The method establishes a virtual connection between the first satellite and the subscriber through the second satellite soon after a handoff decision has been made. All signals subsequently received by the first satellite that are intended for direct transmission from the first satellite to the subscriber are instead transferred to the subscriber via the virtual connection. A notification signal is delivered to the remote gateway after the handoff decision has been made informing the gateway of the handoff. In response to the notification signal, the gateway changes the routing information for all subsequent signals delivered to the subscriber to include the direct link with the second satellite. A "call rerouted" signal indicating that all future transmissions will follow the new route is then delivered to the first satellite which terminates the virtual connection in response thereto.

Figure 1:
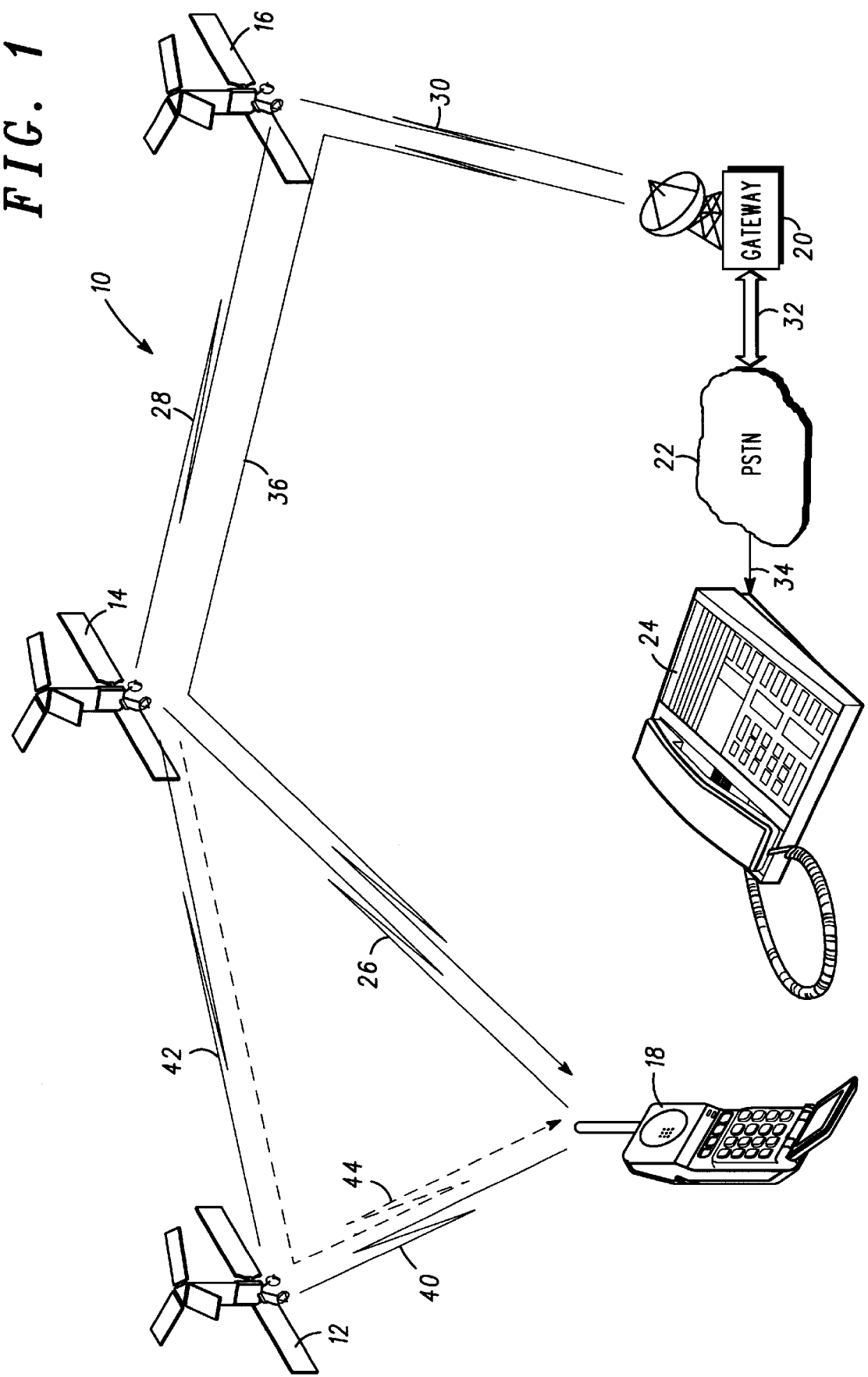
FIG. 1 is a block diagram illustrating a satellite communication system that can utilize the principles of the present invention.

FIG. 1 is a block diagram illustrating a portion of a satellite communication system 10 that can utilize the principles of the present invention. Although the invention will be described in the context of a satellite communication system, it should be appreciated that the inventive principles also have application in other types of wireless networks such as, for example, terrestrial-based wireless networks. As shown, the system 10 includes multiple satellites 12, 14, 16, a subscriber unit 18, and a satellite gateway 20. The satellites 12, 14, 16 are part of a larger constellation of satellites that orbit the earth within substantially fixed orbital planes. Each of the satellites 12, 14, 16 includes internal wireless transmitter and receiver circuitry (not shown) for supporting direct wireless communication links (e.g., links 26, 30, 40) with system subscribers. The satellites 12, 14, 16 each also include cross-link transceiver circuitry for maintaining satellite cross-links (e.g., cross-links 28, 42) with other satellites in the constellation.

The subscriber unit 18 includes, among other things, wireless transceiver circuitry (not shown) that enables a subscriber using the subscriber unit 18 to communicate with the satellites of the system 10. In the illustrated embodiment, the subscriber unit 18 is shown as a portable, handheld unit, although it should be understood that virtually any form of wireless transceiver unit can be used in accordance with present invention, regardless of size, weight, or portability. In addition, it should be understood that the subscriber unit 18 can be located virtually anywhere that a direct wireless link with a satellite is possible, including on the ground, on a ship, on an aircraft, or even on another satellite.

The satellite gateway 20 is a network node that allows the satellite communication system 10 to connect to other external networks so that system subscribers can communicate with users in these external networks. For example, as illustrated in FIG. 1, the gateway 20 is coupled to a public switched telephone network (PSTN) 22 via a wired connection 32. Other network connections are also possible. Gateways are typically located within stationary ground-based facilities, although ground mobile, ship-based, airborne, or satellite-based gateways are also possible.

In a typical communication connection in the system 10, a subscriber using subscriber unit 18 will communicate with a user at a remote telephone unit 24 via a communication path including: a direct wireless link 26 to a first satellite 14, at least one satellite cross-link 28 to a remote satellite 16, a direct wireless link 30 between the remote satellite 16 and the gateway 20, a wired link 32 between the gateway 20 and the PSTN 22, and a wired link 34 between the PSTN 22 and the telephone 24. This communication path will generally be established by a system controller (e.g., in the gateway 20) during an initial call setup operation.

During the above-described connection, signals delivered from the telephone 24 to the subscriber unit 18 will follow a route 36 (see FIG. 1) from the gateway 20 to the subscriber unit 18. Normally, the signals flowing between the nodes in the satellite system 10 comprise "packets" of data that each include a header portion and a payload portion. The payload portion of a packet typically carries a part of the overall message being delivered through the system 10. The header portion of the packet generally includes, among other things, routing information that describes the route that the packet is to take through the system 10 to the destination node. As described above, this route will normally be established during call set up.

When the gateway 20 receives a voice signal from the telephone unit 24 for delivery to the subscriber unit 18, it must convert the voice signal to a proper format for delivery in the satellite system 10. Normally, this conversion process includes digitizing the voice signal, separating the digitized signal into packets, and generating packet headers for each of the packets. The packets are then transmitted, in order, from the gateway 20 to the satellite 16 via wireless link 30. The satellite 16 reads the routing information in the received packets and directs the packets to a next node in the system 10 based thereon. Likewise, each successive node in the route directs the packets based on the routing information in the packet headers. Eventually, the packets arrive at the subscriber unit 18 which reassembles the packets into a useable signal.

While the communication between the subscriber unit 18 and the remote telephone unit 24 is ongoing, the subscriber unit 18 (or another entity) may determine that the wireless link 26 needs to be handed off to another satellite. That is, it may be determined that a direct link 40 between the subscriber unit 18 and a second satellite 12 would be preferable to the direct link 26 between the subscriber unit 18 and satellite 14 for providing the connection between the subscriber unit 18 and the constellation. This determination could be made, for example, by analyzing signals received by the subscriber unit 18 from both satellites 12, 14 and calculating a metric value based on the results of the analysis that indicates that a handoff is desirable. Other methods for making the handoff decision can also be used.

In past systems, after a handoff decision has been made, a handoff request signal is delivered to the gateway 20 through the satellite system 10 requesting the handoff. After receiving the request, the gateway 20 changes the route information within the packets being sent to the subscriber unit 18 to reflect the requested handoff. The gateway 20 then sends an acknowledgment signal to the first satellite 14 indicating that the handoff has been allowed. The first satellite 14 then breaks its direct link with the subscriber unit 18 and the second satellite 12 establishes the physical connection to the subscriber unit 18.

In conceiving of the present invention, it was appreciated that the above-described process that requires the delivery of a message to the gateway 20 before a handoff would be effected can result in relatively large delays in the system 10 that can jeopardize call quality. For example, in the time it takes for the initial handoff request signal to reach the gateway 20, the first satellite 14 can move out of range of the subscriber unit 18, thus resulting in a significant loss of data. In accordance with the present invention, a method is provided that allows a handoff to be performed rapidly without the above-described delays. With reference to FIG. 1, a virtual connection 44 is established from the first satellite 14 to the subscriber unit 18 through the second satellite 12 shortly after a handoff decision has been made. The first satellite 14 then directs all packets that are supposed to be delivered to the subscriber unit 18 through the direct link 26 (i.e., according to the routing information in the packets) through the virtual connection 44. Therefore, an almost immediate reroute of the packets is achieved without having to wait for the handoff request to reach the remote gateway 20.

Contemporaneous with the establishment of the virtual connection 44, a message is delivered to the remote gateway 20 notifying the gateway 20 of the handoff. In response, the remote gateway 20 changes the routing information in all subsequent packets delivered to the subscriber unit 18 to reflect the handoff. The remote gateway 20 then delivers a "call rerouted" signal to the first satellite 14 indicating that the route for the connection has been changed. After the "call rerouted" signal has been received by the satellite 14, the virtual connection 44 is terminated and the handoff is complete.

Figure 2:
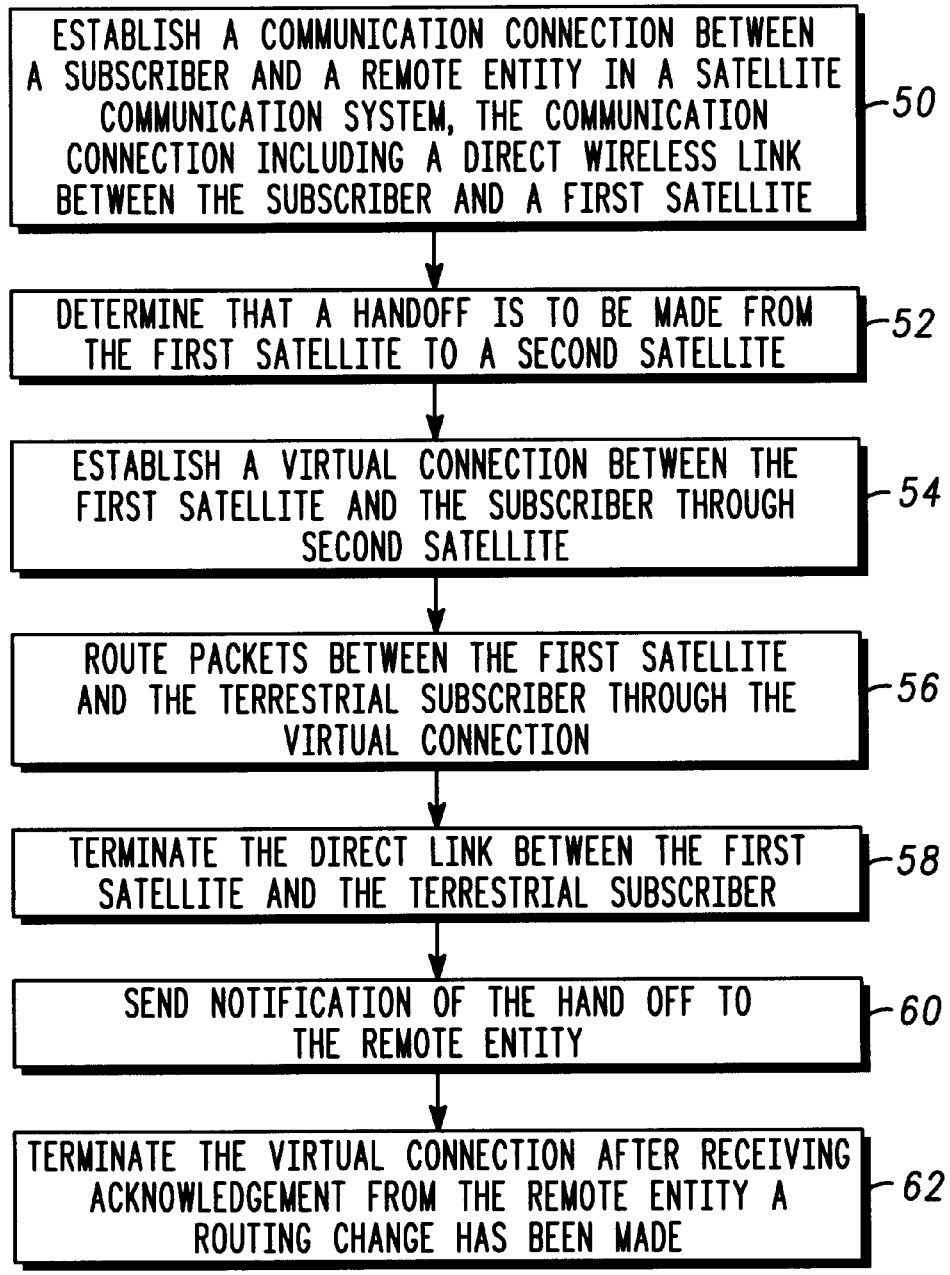
FIG. 2 is a flowchart illustrating a method for performing a handoff in a satellite communication system in accordance with one embodiment of the present invention.

FIG. 2 is a flowchart illustrating a process for performing a handoff in a satellite communication system. A similar process can be used in other types of wireless network. The process will be described with reference to the flowchart of FIG. 2 and the block diagram of FIG. 1. First, a communication connection 36 is established in the satellite communication system 10 between a subscriber unit 18 and a remote entity (step 50). The communication connection includes a direct wireless link 26 between a first satellite 14 in the system 10 and the subscriber unit 18. Next, it is determined that a handoff of the subscriber link 26 needs to be made from the first satellite 14 to the second satellite 12 (step 52). Typically, as described previously, the subscriber unit 18 will make the determination based on broadcast signals received from the first and second satellites 14, 12. Alternatively, the decision can be made within the satellites themselves. As is well known in the art, various other techniques exist for use in making a handoff decision.

After the decision has been made to handoff the subscriber link from the first satellite 14 to the second satellite 12, a virtual connection 44 is established between the first satellite 14 and the subscriber unit 18 through the second satellite 12 (step 54). Typically, the subscriber unit 18 will send a handoff request signal to the first satellite 14, requesting the handoff. The first satellite 14 then sends a channel request to the second satellite 12 (via cross-link 42) requesting a channel for the subscriber unit 18. If the second satellite 12 has a free channel, it reserves the channel for the subscriber unit 18 and informs the first satellite 14 of the reservation. The first satellite 14 then communicates the reserved channel information to the subscriber unit 18 and proceeds to set up the virtual connection 44 to the subscriber unit 18 through the second satellite 12 using the reserved channel.

After the virtual channel 44 has been established, the first satellite 14 routes all subsequently received packets that are supposed to flow to the subscriber unit 18 through the direct link 26 through the virtual channel 44 (step 56). For example, in one embodiment, the first satellite 14 checks the routing information on each of the received packets and if the routing information indicates that the packet is to be directed through the direct link 26, the first satellite 14 will automatically direct the packet to the second satellite 12. Preferably, the second satellite 12 will be programmed so that any packet received from the first satellite 14 that was supposed to flow directly from the first satellite 14 to the subscriber unit 18 is automatically transmitted to the subscriber unit 18 via direct link 40. Alternatively, the first satellite 14 will include an instruction with the packet indicating that the packet is to be delivered to the subscriber unit 18 via direct link 40. The instruction can be a separate signal from the packet or it can be made a part of the packet header information.

After the virtual connection 44 has been established, the direct wireless link 26 between the first satellite 14 and the subscriber unit 18 will be terminated (step 58). Preferably, this termination will occur as soon as possible to free up the corresponding channel for use with another connection. In addition, at some point during the above-described process, notification is sent to the remote entity (e.g., gateway 20) informing it of the handoff (step 60). The remote entity then changes its records to reflect the handoff so that all packets subsequently delivered to the subscriber unit 18 will be routed through the second satellite 12. The remote entity also delivers a "call rerouted" signal to the first satellite 14 notifying it that no further packets will be routed through the first satellite 14 for this connection. After receiving the "call rerouted" signal, the first satellite 14 terminates the virtual connection 44 (step 62). This termination process will generally include exchanging messages between the first satellite 14 and the second satellite 12 to coordinate concurrent termination instants on the satellite and the reallocation of communication resources to other connections between satellites if required.

Although the present invention has been described in conjunction with its preferred embodiments, it is to be understood that modifications and variations may be resorted to without departing from the spirit and scope of the invention as those skilled in the art readily understand. For example, the principles of the present invention can also be used to provide for handoffs of inter-satellite links in a satellite communication system. Alternatively, the inventive principles can be used to perform handoffs in terrestrial wireless systems and the like. Such modifications and variations are considered to be within the purview and scope of the invention and the appended claims.

What is claimed is:

1. A method for performing a handoff of a subscriber link in a satellite communication system having a constellation of communication satellites, said method comprising the steps of:

establishing a subscriber link between a subscriber and the constellation of communication satellites, said subscriber link including a direct wireless link between said subscriber and a first satellite in the constellation of communication satellites;

determining that said subscriber link needs to be handed off from said first satellite to a second satellite in the constellation of communication satellites;

setting up, after said step of determining, a virtual connection between said first satellite and said subscriber through said second satellite;

receiving a data packet at said first satellite that includes routing information indicating that said data packet is to be transferred from said first satellite to said subscriber via said direct wireless link; and transferring said data packet, after said step of receiving, from said first satellite to said subscriber via said virtual connection.

2. The method of claim 1, further comprising:

sending notification to a remote source of data packets indicating that a handoff has been made from said first satellite to said second satellite.

3. The method of claim 2, further comprising:

modifying, in response to said notification, routing information in packets subsequently delivered to said subscriber from said remote source of data packets to indicate that said packets are to be transferred to said subscriber via a direct wireless link from said second satellite.

4. The method of claim 2, further comprising:

terminating said virtual connection in response to a signal received from said remote source of data packets.

5. The method of claim 2, wherein:

said remote source of data packets includes a satellite gateway.

6. The method of claim 2, wherein:

said remote source of data packets includes a remote subscriber.

7. The method of claim 1, further comprising:

terminating said direct wireless link between said first satellite and said subscriber after said step of setting up.

8. The method of claim 1, wherein:

said subscriber includes one of the following: a terrestrial subscriber, a ship-based subscriber, an airborne subscriber, and a satellite-based subscriber.

9. A method for managing communications within a satellite communication system having a constellation of satellites, said method comprising the steps of:

establishing a communication connection between a subscriber and a remote entity through the satellite communication system, said communication connection including a subscriber link between said subscriber and the constellation of satellites, said subscriber link including a direct wireless link between said subscriber and a first satellite in the constellation of satellites;

determining that a handoff of said subscriber link needs to be made from said first satellite to a second satellite;

establishing a virtual connection between said first satellite and said subscriber through said second satellite in response to said step of determining;

terminating said direct wireless link between said subscriber and said first satellite after establishing said virtual connection; and notifying said remote entity of the handoff.

10. The method claimed in claim 9, wherein:

said remote entity is notified of the handoff after the virtual connection has been established.

11. The method claimed in claim 9, wherein:

said step of determining is performed at a location of said subscriber.

12. The method claimed in claim 9, further comprising:

receiving an acknowledgment signal from said remote entity after said step of notifying; and terminating said virtual connection in response to said acknowledgment signal.

13. The method claimed in claim 12, wherein: said acknowledgment signal indicates that future communications from said remote entity to the subscriber will be routed through the second satellite.

14. The method claimed in claim 9, wherein:

said remote entity includes a remote satellite gateway.

15. The method claimed in claim 9, wherein:

said remote entity includes a remote subscriber.

16. The method claimed in claim 9, further comprising the step receiving a data packet at said first satellite that includes routing information indicating that said data packet is to be transferred from said first satellite to said subscriber via a direct link between said first satellite and said subscriber; and automatically transferring said data packet, after said step of receiving, from said first satellite to said subscriber via said virtual connection.

17. A method for performing a handoff in a wireless communication system having a plurality of communication nodes, said method comprising the steps of:

establishing a communication route between a first node and a second node in the plurality of communication nodes, said communication route representing a desired signal path from the first node to the second node through the plurality of communication nodes, said communication route including a direct wireless link between a third node and said second node;

determining that said direct wireless link between said third node and said second node needs to be replaced by a direct wireless link between a fourth node and said second node;

setting up, after said step of determining, a virtual connection between said third node and said second node through said fourth node;

receiving a data signal at said third node that includes routing information indicating that said data signal is to be transferred from said third node to said second node via said direct wireless link between said third node and said second node; and transferring said data signal, after said step of receiving, from said third node to said second node via said virtual connection.

18. The method claimed in claim 17, wherein:

said plurality of communication nodes includes a plurality of communication satellites.

19. The method claimed in claim 17, wherein:

said plurality of communication nodes includes a plurality of terrestrial-based wireless communication transceivers.

20. The method claimed in claim 17, wherein:

said first, second, third, and fourth nodes each comprise a terrestrial-based wireless communication transceiver.

21. The method claimed in claim 17, further comprising:

notifying said first node that a handoff has taken place.

* * * * *